(12) United States Patent
Fell et al.

(10) Patent No.: US 10,981,094 B2
(45) Date of Patent: Apr. 20, 2021

(54) FILTER ASSEMBLY WITH A PRESSURE ACTUATED VALVE ASSEMBLY THAT PERMITS AIR FLOW INTO A ROTARY VESSEL

(71) Applicant: MANN+HUMMEL GmbH, Ludwigsburg (DE)

(72) Inventors: Anthony W. Fell, Yeovil (GB); Tiago Marques, Leca da Palmeira (PT); Angus Rouse, Leeds (GB); Robin Nash, Langport (GB)

(73) Assignee: MANN+HUMMEL GmbH, Ludwigsburg (DE)

(*) Notice: Subject to any disclaimer, the term of this patent is extended or adjusted under 35 U.S.C. 154(b) by 0 days.

(21) Appl. No.: 16/214,100

(22) Filed: Dec. 9, 2018

(65) Prior Publication Data
US 2019/0176066 A1 Jun. 13, 2019

(30) Foreign Application Priority Data

Dec. 8, 2017 (GB) .................................. 1720488

(51) Int. Cl.
*B01D 35/157* (2006.01)
*B01D 33/11* (2006.01)
(Continued)

(52) U.S. Cl.
CPC .......... *B01D 35/1573* (2013.01); *B01D 33/11* (2013.01); *B01D 35/30* (2013.01);
(Continued)

(58) Field of Classification Search
CPC .......... B04B 15/06; B04B 3/00; B04B 11/02; B04B 11/06; B04B 9/06; B04B 5/005;
(Continued)

(56) References Cited

U.S. PATENT DOCUMENTS 2,373,349 A * 4/1945 Serrell .................... F16N 39/06
184/6.21
3,432,091 A * 3/1969 Beazley .................. B04B 5/005
235/60 R
(Continued)

FOREIGN PATENT DOCUMENTS

EP 0699826 A1 3/1996
GB 2113122 A * 8/1983 ............. B04B 5/005
(Continued)

*Primary Examiner* — Charles Cooley
(74) *Attorney, Agent, or Firm* — James Hasselbeck

(57) ABSTRACT

A filter assembly has a housing with a housing inlet and a drain. A rotary vessel is rotatably mounted within the housing and has a rotary vessel inlet and a rotary vessel outlet. Fluid exiting the rotary vessel outlet exits the housing through the drain. A valve assembly moveable between a closed and an open configuration is provided. When closed, the valve assembly fluid-tightly seals rotary vessel inlet from housing inlet. When open, the rotary vessel inlet is in fluid communication with the housing inlet such that fluid flowing into the housing inlet passes into the rotary vessel inlet. The valve assembly is moveable from closed to open configuration when a pressure of fluid flowing into the housing inlet exceeds a threshold pressure. The filter assembly has a fluid passageway permitting air flow into the rotary vessel through the rotary vessel inlet when the valve assembly is closed.

8 Claims, 4 Drawing Sheets

(51) Int. Cl.
  B01D 35/30 (2006.01)
  B04B 9/06 (2006.01)
  F01M 11/03 (2006.01)
  F16K 17/04 (2006.01)
  F16N 39/06 (2006.01)
  B04B 5/00 (2006.01)

(52) U.S. Cl.
  CPC ............ B04B 5/005 (2013.01); B04B 9/06 (2013.01); F01M 11/03 (2013.01); F16K 17/04 (2013.01); F16K 17/0473 (2013.01); F16N 39/06 (2013.01); F16N 2039/065 (2013.01)

(58) Field of Classification Search
  CPC ......... B04B 11/043; B04B 1/08; B04B 11/04; B04B 9/10
  See application file for complete search history.

(56) References Cited

U.S. PATENT DOCUMENTS

| | | | | |
|---|---|---|---|---|
| 3,762,633 A * | 10/1973 | Ishii | ............... | B04B 5/005 494/10 |
| 4,106,689 A * | 8/1978 | Kozulla | ............... | B04B 5/005 494/5 |
| 4,165,032 A * | 8/1979 | Klingenberg | ............ | B04B 5/005 494/38 |
| 4,221,323 A * | 9/1980 | Courtot | ............... | B04B 5/005 494/10 |
| 4,492,631 A * | 1/1985 | Martin | ............... | B04B 5/005 210/127 |
| 5,904,841 A * | 5/1999 | Penny | ............... | B04B 11/04 210/130 |
| 5,906,733 A * | 5/1999 | Purvey | ............... | B01D 29/11 210/100 |
| 6,074,336 A * | 6/2000 | Purvey | ............... | B04B 5/005 494/49 |
| 6,974,408 B2 * | 12/2005 | Grosse-Wiesmann | ............... | B04B 5/005 494/49 |
| 7,393,317 B2 * | 7/2008 | Herman | ............... | B04B 5/005 494/49 |
| 7,871,364 B2 * | 1/2011 | Herman | ............... | B04B 5/005 494/49 |
| 8,323,168 B2 * | 12/2012 | Naegelen | ............... | B04B 11/04 494/5 |
| 9,844,785 B2 * | 12/2017 | Bauditsch | ............... | B04B 9/10 |
| 10,252,280 B2 * | 4/2019 | Bauditsch | ............... | B04B 11/04 |
| 2005/0020428 A1 * | 1/2005 | Grosse-Wiesmann | ............... | B04B 5/005 494/49 |
| 2011/0263406 A1 * | 10/2011 | Naegelen | ............... | B04B 11/04 494/5 |
| 2019/0176066 A1 * | 6/2019 | Fell | ............... | B01D 33/11 |
| 2019/0176067 A1 * | 6/2019 | Fell | ............... | B04B 5/005 |

FOREIGN PATENT DOCUMENTS

| | | |
|---|---|---|
| GB | 2297499 A | 8/1996 |
| GB | 2311239 A | 9/1997 |

* cited by examiner

FILTER ASSEMBLY WITH A PRESSURE ACTUATED VALVE ASSEMBLY THAT PERMITS AIR FLOW INTO A ROTARY VESSEL

BACKGROUND OF THE INVENTION

This invention relates to a filter assembly. The invention particularly, but not necessarily, relates to a filter assembly for a vehicle.

Filter assemblies are known for removing contaminant particles from lubricating oil circuits of internal combustion engines. They are also known for separating particulate matter from liquids, as well as separating liquids of different densities from one another, in a variety of industrial processes. Typically, a filter assembly comprises a housing having a rotor supported therein to spin about an axis of rotation. A working fluid from which a contaminant is to be removed, e.g. engine oil, is supplied at elevated pressure along the axis of rotation to the rotor. Subsequently, the pressurized fluid is tangentially ejected from the rotor such that the rotor is caused to spin. As the working fluid flows through the spinning rotor, denser contaminants or particles are separated therefrom by centrifugal force and retained in the rotor, typically as a cake adhering to an interior surface of the rotor. Ejected fluid drains to a sump.

As retained contaminant particles agglomerate in the rotor, it is necessary to replace or service the rotor at suitably regular intervals to ensure the continued cleaning effectiveness of the filter assembly. It is common that servicing of the rotor requires its removal from the housing.

It is an object of the invention to improve upon and/or reduce a problem associated with one or more known arrangements.

SUMMARY OF THE INVENTION

It is an object of the invention to improve upon and/or reduce a problem associated with one or more known arrangements.

In accordance with the present invention there is provided a filter assembly comprising:

a housing having a housing inlet and a drain;

a rotary vessel rotatably mounted within the housing, the rotary vessel having a rotary vessel inlet and a rotary vessel outlet, where fluid exiting the rotary vessel outlet may exit the housing through the drain;

a valve assembly that is moveable between a closed configuration and an open configuration, wherein in the closed configuration the valve assembly fluid-tightly seals the rotary vessel inlet from the housing inlet, and in the open configuration the rotary vessel inlet is fluidly connected to the housing inlet such that fluid flowing into the housing inlet may pass into the rotary vessel inlet, and wherein the valve assembly is moveable from the closed configuration to the open configuration when a pressure of a fluid flowing into the housing inlet exceeds a threshold pressure; and a fluid passageway arranged to permit air flow into the rotary vessel through the rotary vessel inlet when the valve assembly is in the closed configuration.

In certain embodiments, the fluid passageway may be formed through the valve assembly.

In certain embodiments, the fluid passageway may fluidly connect the rotary vessel inlet to the rotary vessel outlet.

In certain embodiments, the valve assembly may comprise a valve body and biasing device configured to bias the valve body toward a first position in which the valve assembly is in the closed configuration. The valve body may be moveable against a biasing force provided by the biasing device to a second position in which the valve assembly is in the open configuration. The valve body may have a bore therethrough and a radial hole fluidly connected to the bore. The fluid passageway may be at least partly defined by the bore and the radial hole. The radial hole may terminate in a circumferential groove defined in an outer surface of the valve body. The valve assembly may be moveable in a valve channel, the valve channel may have an opening that permits air flow into the valve channel. At least part of the valve channel and the opening may define at least part of the fluid passageway.

In certain embodiments, the fluid passageway may fluidly connect the rotary vessel inlet to the drain when the valve assembly is in the closed configuration. The opening of the valve channel may fluidly connect the valve channel to the drain.

In certain embodiments, the biasing device may comprise a spring.

In certain embodiments, the rotary vessel may comprise a bearing tube that receives a spindle of the filter assembly. The rotary vessel may be rotatable about a longitudinal axis of the spindle.

BRIEF DESCRIPTION OF THE DRAWINGS

Embodiments of the invention are further described hereinafter with reference to the accompanying drawings.

DESCRIPTION OF PREFERRED EMBODIMENTS

Figure 1:
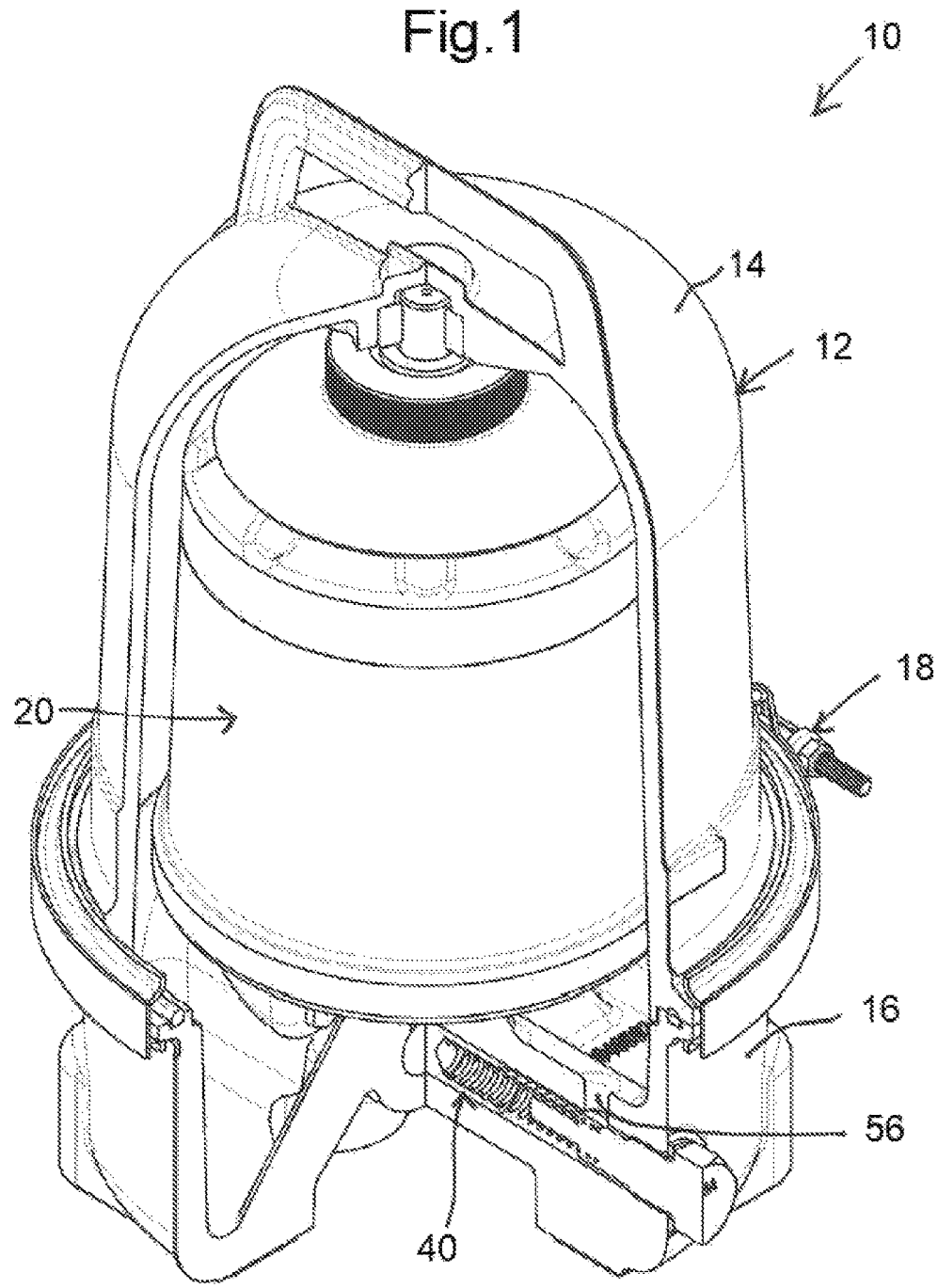
FIG. 1 shows a filter assembly according to an embodiment of the present invention.

FIG. 1 shows a filter assembly 10 according to an embodiment of the invention. The filter assembly 10 has particular application in a motor vehicle, e.g. for cleaning engine oil in an engine lubrication system. However, other applications are contemplated, e.g. for use in oil recovery and in the manufacture of food products.

The filter assembly 10 comprises a housing 12 having a first housing part 14 and a second housing part 16. The first housing part 14 is removably attachable to the second housing part 16 (which is usually fixed on a vehicle or engine). The first housing part 14 may be releasably secured to the second housing part 16 by a closure member 18, such as a hose clip, for example. One or more seals may be provided between the first housing part 14 and the second housing part 16 such that a fluid-tight connection may be made therebetween.

Figure 2:
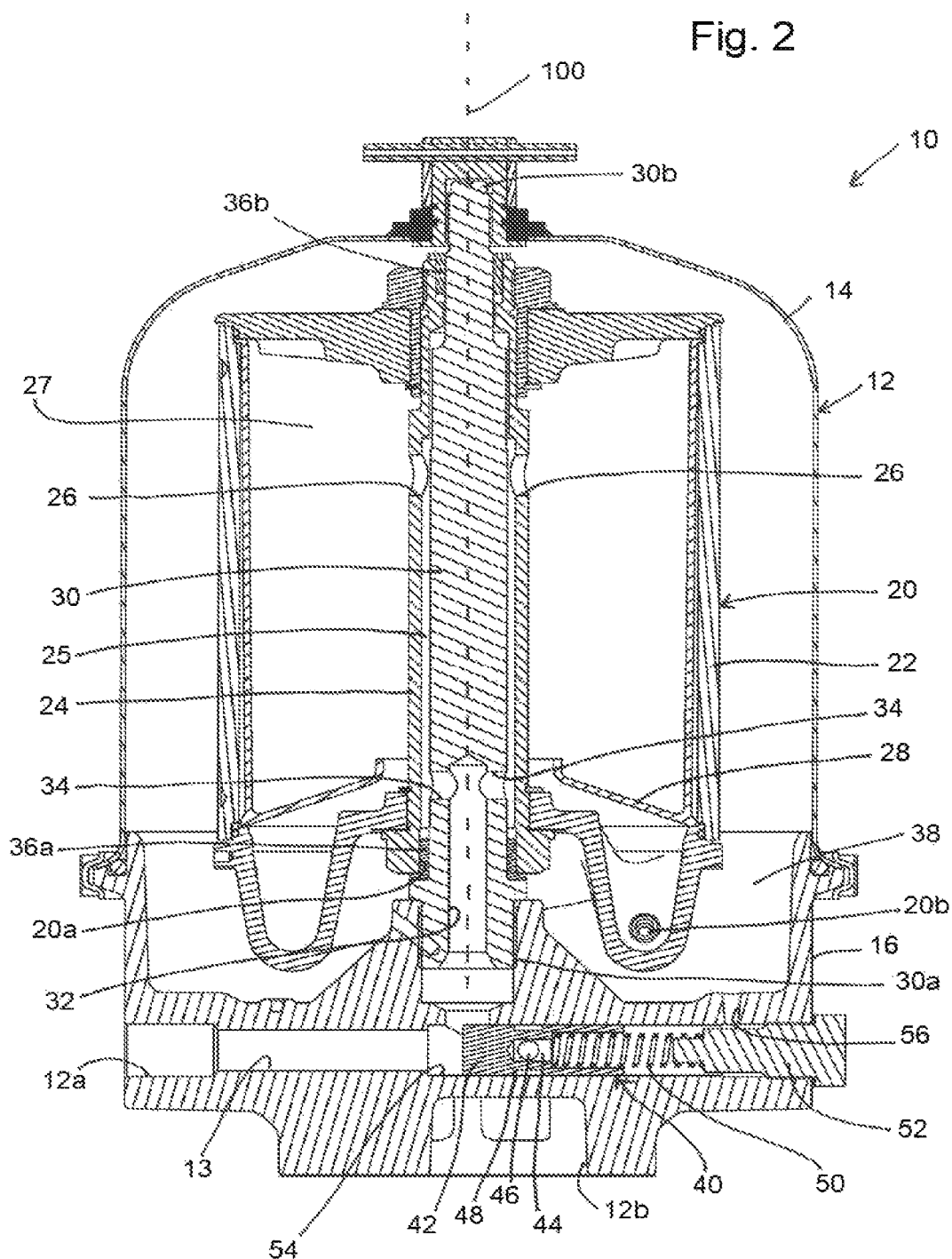
FIG. 2 shows a cross-sectional view of the filter assembly of FIG. 1 with the valve assembly in an open configuration.

As shown in FIG. 2, the filter assembly 10 further comprises a rotary vessel 20 having a rotor body 22 that is rotatable within the housing 12 about an axis of rotation 100. References herein to axial movement, axial extension, etc. relate to being at least generally parallel to the axis of rotation 100. References herein to radial movement, radial extension, etc. relate to being at least generally perpendicular to the axis of rotation 100.

The rotary vessel 20 defines a bearing tube 24 having a bore that receives a spindle 30 of the filter assembly 10. The spindle 30 extends along the longitudinal axis 100 and has a bottom end 30a that is rotationally fixed relative to the housing 12 (in particular, to the second housing part 16 in the embodiment shown in the Figures), and a top end 30b that is rotationally fixed relative to the housing 12 (in particular, the first housing part 14 in the embodiment shown in the Figures). The rotary vessel 20 is rotatably mounted to the spindle 30. In the non-limiting embodiment shown in the Figures, the rotary vessel 20 is rotatably mounted to the spindle 30 by a bottom bearing assembly 36a disposed towards the bottom end 30a of the spindle 30 and a top bearing assembly 36b disposed towards the top end 30b of the spindle 30. In alternative embodiments, the rotary vessel 20 may be rotatably mounted in the housing 12 by alternative means. For example, in certain embodiments, the spindle 30 may not be present, and, instead, the rotary vessel 20 may include a spigot at each of its top and bottom ends, where the spigots are journaled for rotation within the housing 12.

A bottom end of the bearing tube 24 defines a rotary vessel inlet 20a. The spindle 30 extends through the rotary vessel inlet 20a into the bearing tube 24. The spindle 30 has a bore 32 extending from an opening in the bottom end 30a, and radial holes 34 fluidly connecting the bore 32 to an annulus 25 defined between the spindle 30 and the bearing tube 24. This arrangement permits a fluid to enter the annulus 25 through the rotary vessel inlet 20a via the bore 32.

A valve or valve assembly 40 is provided and is movable between a closed configuration and an open configuration. The housing 12 has a housing inlet 12a that is fluidly coupled to a channel 13 that is interrupted by the valve assembly 40 when it is in the closed configuration. When the valve assembly 40 is in the open configuration, the housing inlet 12a is fluidly connected to the rotary vessel inlet 20a by the channel 13. When the valve assembly 40 is in the closed configuration, the valve assembly 40 fluid-tightly seals the rotary vessel inlet 20a from the housing inlet 12a such that fluid may not enter the rotary vessel inlet 20a from the housing inlet 12a.

Figure 3:
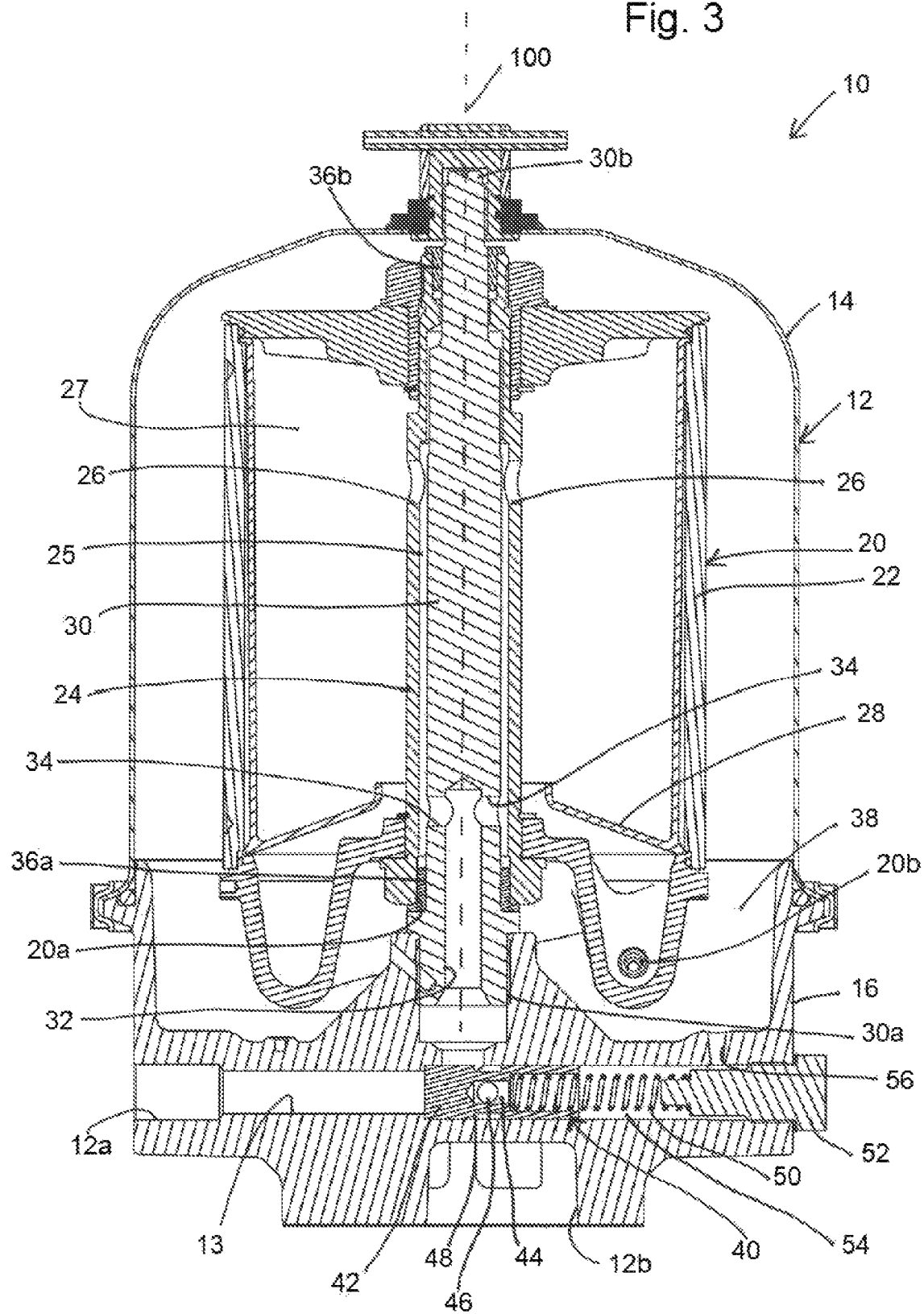
FIG. 3 shows a cross-sectional view of the filter assembly of FIG. 1 with the valve assembly in a closed configuration.

In the non-limiting embodiment shown in the Figures, the valve assembly 40 comprises a valve body 42 that is moveable in a valve channel 54 and biasing device 50 configured to bias the valve body 42. In particular, the biasing device 50 (which may be a spring as illustrated in the Figures) biases the valve body 42 towards a first position in the channel 13 in which the valve assembly 40 is in the closed configuration. The valve body 42 is moveable against a biasing force provided by the biasing device to a second position in the channel 13 in which the valve assembly 40 is in the open configuration. FIG. 2 shows the filter assembly 10 with the valve assembly 40 in the open configuration (and the valve body 42 in the second position in the channel 13). FIG. 3 shows the filter assembly 10 with the valve assembly 40 in the closed configuration (and the valve body 42 in the first position in the channel 13). The valve assembly 40 includes a stationary fitment 52 that provides an end stop to which the biasing device 50 is attached.

Further features of the valve assembly 40 are described in further detail below.

A fluid to be cleaned/filtered, e.g. engine oil, may be supplied to the filter assembly 10 through the housing inlet 12a. If the pressure of the fluid entering the channel 13 through the housing inlet 12a has a pressure that is equal to or greater than a threshold pressure then the valve assembly 40 may move from the closed configuration to the open configuration. In relation to the embodiment shown in the Figures, the threshold pressure is defined as a pressure that is sufficient to move the valve body 42 from the first position to the second position against the biasing force provided by the biasing device 50.

With the valve assembly 40 in the open configuration, the housing inlet 12a is in fluid communication with the rotary vessel inlet 20a such that fluid entering the housing inlet 12a may flow into the annulus 25 through the bore 32. From the annulus 25, the fluid may flow under its own pressure through one or more radial holes 26 in the bearing tube 24 into a rotary vessel chamber 27 of the rotary vessel 20. The one or more radial holes 26 may extend through the bearing tube 24 substantially at right angles to the axis of rotation 100.

As in the illustrated embodiment, the rotary vessel 20 may be self-powerable, i.e. the pressurized supply of fluid may drive rotation of the rotary vessel 20. To this end, the rotor body 22 may comprise one or more rotary vessel outlets 20b that are fluidly connected with the rotary vessel chamber 27. The one or more rotary vessel outlets 20b may each be provided at a radial distance from the axis of rotation 100 and configured such that the fluid exits the rotary vessel chamber 27, through the one or more rotary vessel outlets 20b, in a direction generally tangential to the rotary vessel 20. As will be understood, the tangential emission of the fluid, at elevated pressure, results in a reactive force that causes rotation of the rotary vessel 20 about the axis of rotation 100. In certain embodiments, the one or more rotary vessel outlets 20b may each be provided with a nozzle or be otherwise shaped to provide an elevated pressure of the fluid exiting therethrough, thereby increasing the speed of rotation of the rotary vessel 20 in the housing.

As the fluid flows through the spinning rotary vessel 20, centrifugal force causes separation of contaminant material within the fluid. Separated contaminant material may accumulate within the rotary vessel chamber 27, primarily as a cake adhering to an interior surface of the rotary vessel chamber 27 or to a liner provided therein. The filtered fluid passes through a separation cone 28 within the rotary vessel chamber 27 before exiting the rotary vessel 20 through the one or more rotary vessel outlets 20b. The fluid exiting the rotary vessel 20 passes into a lower chamber 38 of the filter assembly 10 before draining to a sump and exiting the filter assembly 10 though a drain 12b of the housing 12 that is fluidly connected to the lower chamber 38.

As contaminant accumulates within the rotary vessel chamber 27, the filter assembly 10 must be serviced, e.g. either to clean or replace the rotary vessel 20. To service the filter assembly 10, it may be necessary to remove the rotary vessel 20 from within the housing 12. Removal of the rotary vessel 20 from within the housing 12 requires separation of the first housing part 14 from the second housing part 16.

When removing the rotary vessel 20 from the housing 12 after use, it is highly likely that fluid will remain in at least a lower portion of the bearing tube 24 below the radial holes 26. When not in use, the valve assembly 40 will be in the closed configuration thereby preventing this fluid from draining back out through the housing inlet 12a.

In prior art arrangements, this remaining fluid provides a seal between the rotary housing 20 and the spindle 30 (or other part of the filter assembly 10) that makes removal of the rotary vessel 20 difficult. Additionally, in prior art arrangements the remaining fluid may be carried with the rotary vessel 20 as it is removed from the housing 12, thereby risking the spilling of the remaining fluid on the user or otherwise outside the housing 12.

Embodiments of the present invention overcome or reduce such problems.

Figure 4:
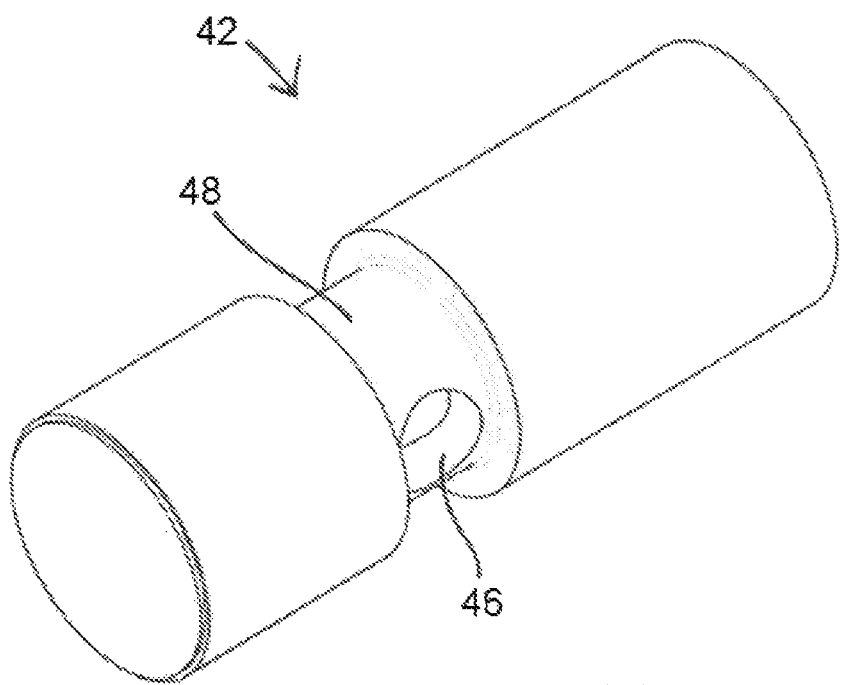
FIG. 4 shows a detailed view of the valve body of the valve assembly.
Figure 5:
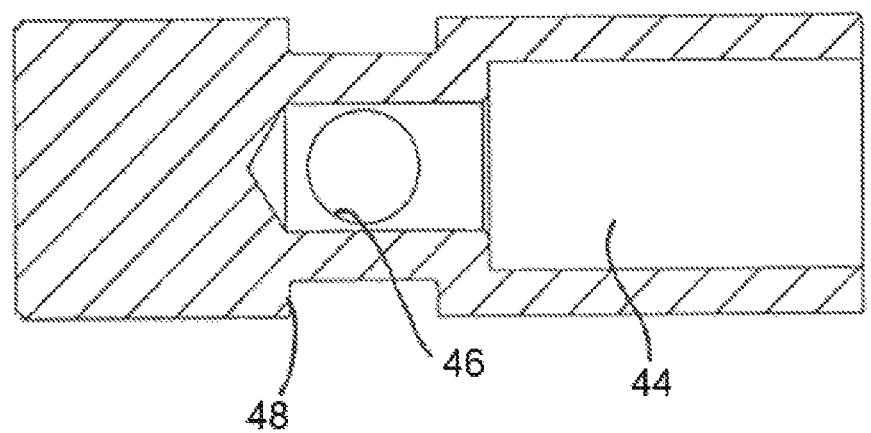
FIG. 5 shows a cross-sectional view of the valve body of FIG. 4.

FIGS. 4 and 5 show the valve body 42 in more detail. As shown in FIG. 5, the valve body 42 has a bore 44 (an axial bore) that extends axially through a rear end of the valve body 42 so as to be in fluid communication with the valve channel 54 when assembled (as shown in FIGS. 2 and 3). One or more radial bores 46 or radial holes 46 extend through the valve body 42 and are in fluid communication with the bore 44 of the valve body 42 (and are therefore in fluid communication with the valve channel 54). The housing 12 (the second housing part 16, in particular) includes an opening 56 which fluidly connects the lower chamber 38 of the filter assembly 10 to the valve channel 54.

When the valve assembly 40 is in the closed configuration, the position of the one or more radial holes 46 in the valve body 42 are such that a fluid path is established between the rotary vessel inlet 20a (via the bore 32 of the spindle 30) and the drain 12b (via the lower chamber 38). Such an arrangement permits air flow into the rotary vessel 20 through the rotary vessel inlet 20a when the valve assembly 40 is in the closed configuration. That is, the combination of the one or more radial holes 46 of the valve body 42, the bore 44 of the valve body 42, the valve channel 54, the opening 56, and the lower chamber 38 form at least part of a fluid passageway that permits air flow into the rotary vessel 20 through the rotary vessel inlet 20a when the valve assembly 40 is in the closed configuration. In this embodiment, the source of the air flow may be a sump (not shown) that is connected to the drain 12b. By permitting air to be drawn into the rotary vessel 20 when the valve assembly 40 is in the closed configuration, the seal formed by fluid remaining in the bearing tube 24 may be broken, thereby permitting easier removal of the rotary vessel 20 from the housing 12. Additionally, the remaining fluid may more readily drain out of the rotary vessel inlet 20a into the housing 12 as the rotary vessel 20 is removed from the housing 12, thereby reducing the risk of such fluid spilling onto the user or otherwise outside of the housing 12. Indeed, when the valve assembly 40 is in the open configuration, air flow is not permitted into the rotary vessel 20 through the rotary vessel inlet 20a via the fluid passageway. For example, in the embodiment where the source of air flow is a sump that is connected to the drain 12b, when the valve assembly 40 is in the open configuration, the drain 12b is not fluidly connected to the rotary vessel inlet 20a by the fluid passageway.

In the particularly preferable embodiment shown in the Figures, the one or more radial holes 46 of the valve body 42 extend from the bore 44 of the valve body 42 and terminate in a circumferential groove 48 around the valve body 42. The circumferential groove 48 advantageously ensures that the one or more radial holes 46 of the valve body 42 may be in fluid communication with the rotary vessel inlet 20a irrespective of the rotational position of the valve body 42 in the valve channel 54.

In alternative embodiments, the fluid passageway may be otherwise provided. The fluid passageway may be any passageway permitting air flow into the rotary vessel 20 through the rotary vessel inlet 20a. Whilst in preferable embodiments, the fluid passageway is at least partly defined through the valve assembly 40, in other embodiments, the fluid passageway may be defined elsewhere in the filter assembly 10. In any embodiment, the fluid passageway may permit air flow into the rotary vessel 20 through the rotary vessel inlet 20a from the sump that is connected to the drain 12b of the housing. In alternative embodiments, the fluid passageway may permit the flow of air from other sources and/or via alternative route. For example, the fluid passageway could extend through the housing 12 to atmosphere, although such embodiments would preferably need to incorporate means for reducing or preventing the fluid to be filtered (or filtered fluid) from leaking out of the housing 12 along such a fluid passageway. The fluid passageway may be any suitable fluid passageway that permits the pressure at the rotary vessel inlet 20a to substantially equalize with the pressure at the rotary vessel outlet 20b.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A filter assembly comprising:
   a housing comprising:
      a first housing part;
      a second housing part forming a base on which the first housing part is arranged, the second housing part including:
      a housing inlet formed as an inlet channel in the second housing part;
      a valve channel fluidically connected to the inlet channel of the housing inlet; and
      a drain;
      a rotary vessel rotatably mounted to rotate on an axis of rotation within the housing, the rotary vessel comprising:
      a rotary vessel chamber arranged in an interior of the rotary vessel; a bearing tube arranged on the axis of rotation and extending axially in the interior of the rotary vessel, from a lower axial end to an upper axial end of the rotary vessel;
      a spindle having a longitudinal axis aligned with the axis of rotation, a first axial end of the spindle secured to the second housing part, the spindle having a bore at the first axial end forming a rotary vessel inlet;

wherein the spindle is arranged in an interior of the bearing tube and the rotary vessel with the bearing tube rotate about the spindle; and a rotary vessel outlet;

a valve assembly having a valve body arranged in the valve channel configured to move from a closed configuration to an open configuration in response to pressure of the fluid flowing into the housing inlet exceeding a threshold pressure, wherein, when the valve body is moved to the closed configuration, a radial bore formed through the valve body opens to partly define a fluid passageway that fluidly connects the rotary vessel inlet of the spindle to the drain while fluid-tightly sealing the rotary vessel inlet from the housing inlet, wherein, when the valve assembly is moved to the open configuration, the rotary vessel inlet is put in fluid communication with the housing inlet permitting a fluid flowing into the housing inlet to pass into the rotary vessel inlet, and the radial bore through the valve body to the drain is closed by the valve assembly, wherein, when the valve assembly is in the open configuration, the fluid exiting the rotary vessel through the rotary vessel outlet exits the housing through the drain.

2. A filter assembly according to claim 1, wherein the fluid passageway fluidly connects the rotary vessel inlet to the rotary vessel outlet.

3. A filter assembly according to claim 1, wherein the valve assembly comprises
the valve body and
a biasing device configured to bias by a biasing force the valve body toward a first position,
wherein, in the first position of the valve body, the valve assembly is in the closed configuration,
wherein the valve body is configured to move against the biasing force into a second position,
wherein, in the second position of the valve body, the valve assembly is in the open configuration.

4. A filter assembly according to claim 3, wherein the valve body comprises:
an axial bore that extends axially in the valve body through a rear end of the valve body, and
the radial bore fluidly connected to the axial bore,
wherein the fluid passageway is at least partly defined by the axial bore and the radial bore.

5. A filter assembly according to claim 4, wherein an outer surface of the valve body comprises
a circumferential groove and
wherein the radial bore terminates in the circumferential groove.

6. A filter assembly according to claim 3,
wherein the valve channel comprises
an opening configured to permit the air flow into the valve channel,
wherein the fluid passageway is at least partly defined by the valve channel and the opening of the valve channel.

7. A filter assembly according to claim 3, wherein the biasing device comprises a spring.

8. A filter assembly according to claim 1, wherein the spindle includes at least one radial hole extending from the bore of the spindle to an outer side of the spindle to discharge at an interior of the bearing tube;
wherein a separating cone is arranged in the interior of the rotary vessel and having an opening through which the bearing tube extends, the separating cone separating the rotary vessel chamber from a lower chamber in the interior of the rotary vessel.

\* \* \* \* \*